March 6, 1973 G. L. POWER Re. 27,594

TIP-OVER SHUT-OFF FOR GAS HEATERS

Original Filed May 24, 1965

INVENTOR.
GERARD L. POWER

BY
Whittemore, Hulbert & Belknap
ATTORNEYS

United States Patent Office

Re. 27,594
Reissued Mar. 6, 1973

27,594

TIP-OVER SHUT-OFF FOR GAS HEATERS

Gerard L. Power, Dearborn Heights, Mich., assignor to Insto-Gas Corporation, Detroit, Mich.

Original No. 3,314,411, dated Apr. 18, 1967, Ser. No. 458,219, May 24, 1965. Application for reissue June 23, 1971, Ser. No. 156,043

Int. Cl. F23n *5/24;* F24c *3/12*

U.S. Cl. 126—85 R 6 Claims

Matter enclosed in heavy brackets [ ] appears in the original patent but forms no part of this reissue specification; matter printed in italics indicates the additions made by reissue.

*ABSTRACT OF THE DISCLOSURE*

*A portable heater assembly having a gas burner. A valve in the gas line to the burner is normally held open by an electromagnet when the burner is operating. A mercury switch is operative to deenergize the electromagnet in response to tipping of the heater assembly from upright position, whereupon the valve is closed by a spring to shut off the burner.*

This invention relates generally to heaters and refers more particularly to a portable gas heater.

Portable heaters of this type have a great many uses. They are used a great deal in winter construction work. They may be used to keep concrete from freezing while it cures, or simply to keep the workers warm. Such heaters are sometimes used by farmers in the wintertime.

An essential object of this invention is to provide safety means for automatically shutting off the heater in case it should be accidentally tipped over. The main purpose of shutting off the heater when it tips over is to eliminate the danger of fire.

Another object of the invention is to provide a portable heater having a valve in the gas line to the burner, and means responsive to the tipping of the heater from an upright position for closing the valve.

Another object is to provide a heater having means for controlling the valve including an electric circuit, an electromagnet energized by the circuit and operative to hold the valve open, a mercury switch responsive to tipping of the heater from upright position for opening the circuit and thereby rendering the electromagnet inoperative, and resilient means for closing the valve when the electromagnet is inoperative.

Other objects and features of the invention will become apparent as the description proceeds, especially when taken in conjunction with the accompanying drawings wherein.

Figure 1:
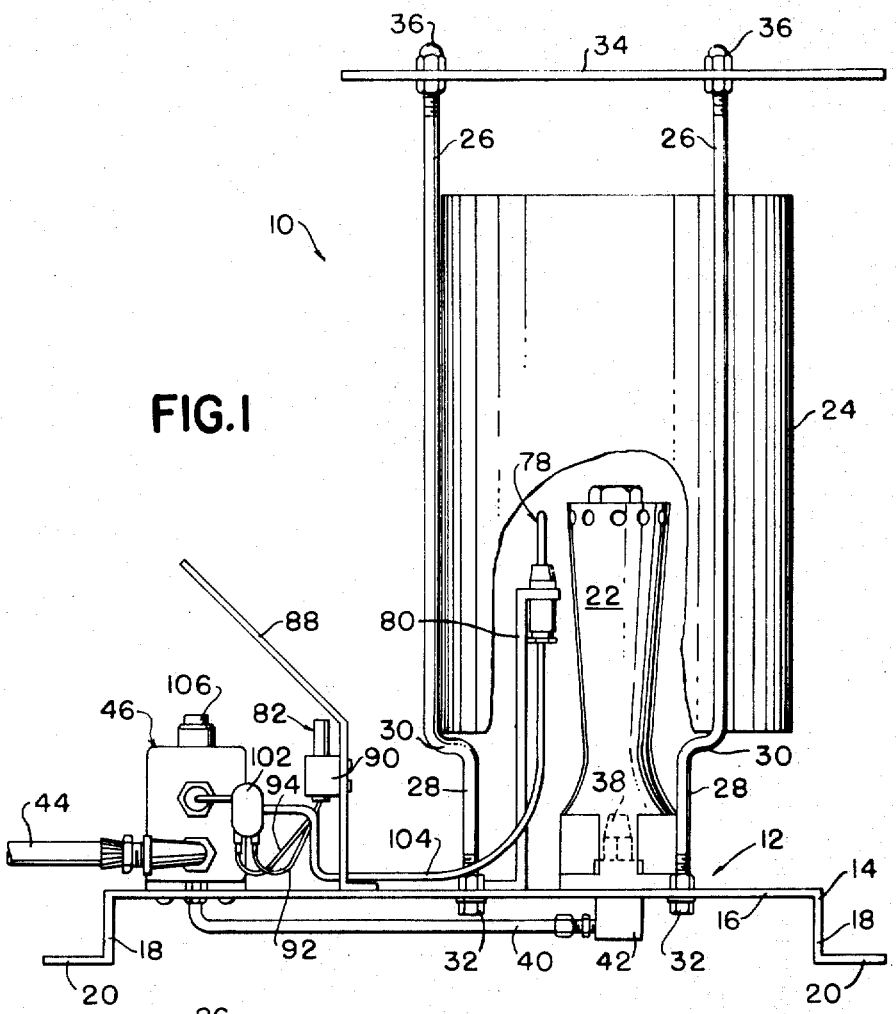
FIGURE 1 is a side elevational view with parts broken away of a portable gas heater having the safety means for shutting off the gas to the burner when the heater is tipped from upright position, all constructed in accordance with the invention.

Referring now more particularly to the drawings, the portable gas heater assembly is generally designated 10 in FIGURE 1 and comprises a support structure 12 on which the various components are mounted.

The support structure 12 includes a base 14 which preferably is of sheet metal construction and has a flat horizontal plate portion 16 terminating at the opposite ends in depending angle supports 18. These angle supports have horizontal flanges 20 provided to support the support structure in the upright position shown in FIGURE 1 when resting upon a flat horizontal surface.

Mounted upon the plate portion 16 of base 14 is a burner 22. The burner is mounted in fixed position on the plate portion 16 and extends vertically upward therefrom. A vertical combustion cylinder 24 surrounds the burner 22 and is supported by the vertical rods 26. Preferably there are three such rods 26 spaced angularly with respect to each other and extending along the outer surface of the cylinder. The lower end portions 28 of these rods are offset radially inwardly to provide supporting portions 30 upon which the lower end of the cylinder 24 rests. The portions 28 of the rods are secured at their lower ends by fasteners 32 to the plate portions 16 of the base, and a hood 34 is secured to the upper ends of the rods 26 by fasteners 36 in a position over the upper end of the cylinder.

Gas is admitted to the burner 22 by a jet 38 extending upwardly into the lower end of the burner. Gas is delivered to the jet through the fuel tube 40 and the burner base 42. The burner 22 is threaded to burner base 42, and the plate portion 16 is clamped between the burner and burner base. The gas enters the fuel tube by way of a hose 44 and a valve assembly 46 mounted on plate 16 of the base. The hose 44 connects into the valve assembly through port 48, and the fuel tube 40 connects into the valve assembly through port 50. During normal operation of the burner, the valve assembly 46 is open to admit a continuous flow of gas to the burner through the hose 44, fuel tube 40 and jet 38.

Figure 2:
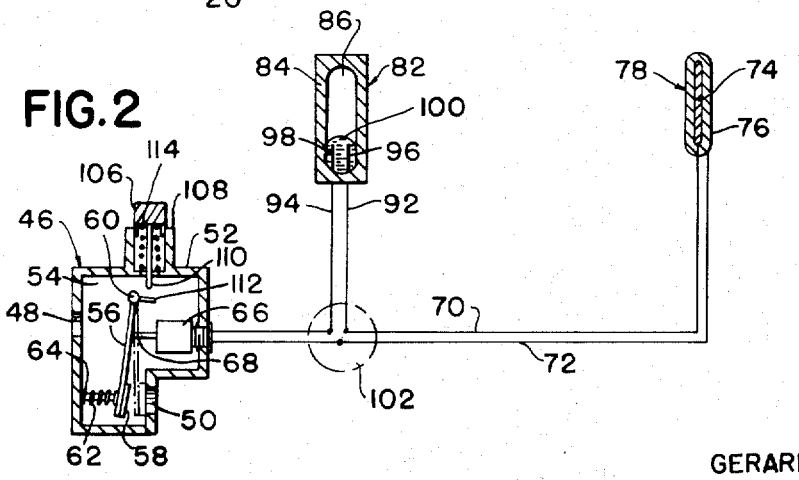
FIGURE 2 is a diagrammatic view, in partial section, of the safety mechanism.

The valve assembly 46 comprises a housing 52 having a chamber 54. The ports 48 and 50 are formed in the walls of the housing. Within the housing chamber there is a valve member 56 in the form of an elongated arm having a valve element 58 at the lower end. The valve member 56 turns on a fixed pivot 60 at its upper end. A compression coil spring 62, surrounding a pin 64 fixed within chamber 54, imposes a constant pressure on the valve member 56 tending to move it to the right in FIGURE 2 to the dotted line position in which it would close port 50 and shut off the flow of gas to the burner.

An electromagnet 66 is mounted on housing 52 within chamber 54 and has a core 68. When the electromagnet is energized, the core shifts to the left and engages valve member 56. The electromagnet 66 is strong enough to hold the valve member 56 in the open or solid line position.

The electromagnet is adapted to be energized by a circuit including the leads 70 and 72. These leads are respectively connected to the two dissimilar metal elements 74 and 76 making up the thermocouple 78. The thermocouple 78 is supported on a bracket 80 fixed to plate portion 16 of the base in a position opposite the burner so that the thermocouple is heated when the burner is in operation. The heating of the thermocouple by the burner is sufficient to generate a milliamp current in the circuit including leads 70 and 72 sufficient to energize the electromagnet 66.

The circuit includes a mercury switch 82 which includes an elongated housing 84 having an elongated chamber 86. The housing 84 is mounted in vertical upright position on a panel 88 by a clip 90 so that chamber 86 is also vertical. The panel 88 is secured to the plate portion 16 of the base. The lead 70 in the circuit has portions 92 and 94 terminating in contacts 96 and 98 in the lower end of vertical chamber 86. A ball of liquid mercury 100 lies in the bottom of chamber 86 covering the contacts 96 and 98 to complete the circuit across the contacts. The lead portions 92 and 94 are connected into the circuit at the junction 102. The leads 70 and 72 are insulated from one another and are carried in a single conductor 104.

In order to start the burner, a manual valve element 106 is provided which is slidably mounted in a hollow boss 108 formed in the upper wall of valve assembly housing 52. The manual valve element 106 has a pin 110 depending from the head of the valve element into the chamber 54 opposite the lever 112 which is rigidly connected to valve member 56 to pivot as a unit therewith. A compression coil spring 114 in boss 108 normally holds the manual valve element 106 in its upper retracted position.

When the manual valve element 106 is depressed the lower end of pin 110 engages lever 112 to pivot the valve member 56 to the solid line position against the action of spring 62, opening the valve for the flow of gas therethrough to the burner. After the burner has ignited for a short period of time, a milliamp current will be generated in the circuit by the heating of the thermocouple, the current being sufficient to energize the electromagnet 66 and project its core member 68 to the left and engage the valve member 56. The electromagnet is sufficiently strong to hold the valve member 56 open against the action of spring 62. Accordingly the manual valve element 106 may be released. The circuit to the electromagnet is through the mercury switch 82.

The circuit through the mercury switch will remain completed so long as the heater is in the upright position shown in FIGURE 1. In the event the heater should be accidentally tipped from the upright position shown, the ball of mercury 100 will roll away from one or the other of contacts 96 and 98, breaking the circuit to the electromagnet. Upon de-energization of the electromagnet, the valve member 56 will instantly be pivoted to its dotted line position by spring 62, closing off the flow of gas to the burner. Accordingly, whenever the heater is tipped from its upright position the burner will be shut off and the danger of fire will be eliminated.

The burner can be again ignited by restoring it to an upright position, depressing the manual valve element 106 to open the gas line to the burner, lighting the burner and holding the manual valve element depressed long enough to generate an energizing current in the circuit so that the electromagnet may thereafter hold the valve element in open position.

What I claim as my invention is:

1. A portable heater assembly adapted to rest upon a supporting surface in an upright position, said heater assembly including a gas burner, a gas line leading to said burner for delivering gas thereto for combustion, a valve in said gas line, means for controlling said valve including an electric circuit, means energized by said circuit operative to hold said valve open, [means] *a mercury switch* responsive to tipping of said heater assembly from upright position for opening said circuit and thereby rendering said holding means [inopeartive] *inoperative,* and means for closing said valve when said holding means is inoperative.

2. A portable heater assembly adapted to rest upon a supporting surface in an upright position, said heater assembly including a gas burner, a gas line leading to said burner for delivering gas thereto for combustion, a valve in said gas line, means for controlling said valve including an electric circuit, electromagnetic means energized by said circuit and operative to hold said valve open, a mercury switch mounted on said heater assembly and responsive to tipping of said heater assembly from upright position for opening said circuit and thereby rendering said holding means inoperative, and resilient means for closing said valve when said holding means is inoperative.

3. A portable heater comprising a support structure having a base for supporting the same upright on a supporting surface, a gas burner mounted on said support structure, a gas line leading to said burner for delivering gas thereto for combustion, a valve in said gas line, means for controlling said valve including an electric circuit, a thermocouple in said circuit adapted to be heated when said heater is operated so as to generate a current in said circuit, electromagnetic means energized by said circuit and operative to hold said valve open, a mercury switch mounted on said support structure and responsive to tipping of said support structure from upright position for opening said circuit and therey rendering said holding means inoperative, and resilient means for closing said valve when said holding means is inoperative.

4. A portable heater assembly adapted to rest upon a supporting surface in upright position, said heater assembly including a gas burner, a gas line leading to said burner for delivering gas thereto for combustion, a valve in said gas line, means for closing said valve, electrically operated means for holding said valve open against the action of said closing means, and a mercury switch mounted on said heater assembly for rendering said electrically operated means inoperative in response to tipping over of said heater assembly from upright position.

5. A portable heater assembly adapted to rest upon a supporting surface in upright position, said heater assembly including a gas burner, a gas line leading to said burner for delivering gas thereto for combustion, a valve in said gas line, a mercury switch mounted on said heater assembly and operative to open in response to the tipping over of said heater assembly, and means for closing said valve when said mercury switch opens.

6. A portable heater assembly adapted to rest upon a supporting surface in upright position, said heater assembly including a gas burner, a gas line leading to said burner for delivering gas thereto for combustion, a valve in said gas line, a mercury switch mounted on said heater assembly and operated in response to the tipping over of said heater assembly, and means for closing said valve when said mercury switch is operated.

References Cited

The following references, cited by the Examiner, are of record in the patented file of this patent or the original patent.

UNITED STATES PATENTS

| | | | |
|---|---|---|---|
| 1,309,000 | 7/1919 | Townsend et al. | 126—85 R |
| 2,192,858 | 3/1940 | Peterson | 431—18 X |
| 2,201,385 | 5/1940 | Woodson | 431—75 |
| 2,703,582 | 3/1955 | Stepanian | 137—38 |
| 2,812,399 | 11/1957 | Schroeder | 200—61.47 |

FOREIGN PATENTS

| | | | |
|---|---|---|---|
| 906,190 | 9/1962 | Great Britain | 431—88 |

CHARLES J. MYHRE, Primary Examiner

U.S. Cl. X.R.

137—38; 431—80, 88